US012741279B2

(12) United States Patent
Laurent et al.

(10) Patent No.: US 12,741,279 B2
(45) Date of Patent: Sep. 22, 2026

(54) MICROFLUIDIC LIQUID DELIVERY DEVICE

(71) Applicant: ASTRAVEUS, Paris (FR)

(72) Inventors: Jérémie Laurent, Villeurbanne (FR); Xue Hou, Suresnes (FR)

(73) Assignee: ASTRAVEUS, Paris (FR)

( * ) Notice: Subject to any disclaimer, the term of this patent is extended or adjusted under 35 U.S.C. 154(b) by 787 days.

(21) Appl. No.: 18/003,207

(22) PCT Filed: Jun. 22, 2021

(86) PCT No.: PCT/EP2021/067045
§ 371 (c)(1),
(2) Date: Dec. 23, 2022

(87) PCT Pub. No.: WO2021/259956
PCT Pub. Date: Dec. 30, 2021

(65) Prior Publication Data

US 2023/0249177 A1 Aug. 10, 2023

(30) Foreign Application Priority Data

Jun. 26, 2020 (EP) .................................... 20305711

(51) Int. Cl.
*B01L 3/02* (2006.01)
*B01L 3/00* (2006.01)

(52) U.S. Cl.
CPC ....... *B01L 3/502715* (2013.01); *B01L 3/0293* (2013.01); *B01L 2200/146* (2013.01); *B01L 2300/0681* (2013.01); *B01L 2400/0487* (2013.01); *B01L 2400/0655* (2013.01)

(58) Field of Classification Search
CPC ............ B01L 3/502715; B01L 3/0293; B01L 2200/146; B01L 2300/0681; B01L 2400/0487; B01L 2400/0655; B01L 2200/0647; G01F 1/76; G01F 15/002; G01F 15/005; G01F 15/125; G01F 11/28
USPC .......................................................... 436/180
See application file for complete search history.

(56) References Cited

U.S. PATENT DOCUMENTS

| | | | |
|---|---|---|---|
| 5,742,523 | A | 4/1998 | Thomas et al. |
| 5,857,590 | A | 1/1999 | Kao et al. |
| 6,499,515 | B2 | 12/2002 | Sander |
| 2005/0056713 | A1 | 3/2005 | Tisone et al. |

FOREIGN PATENT DOCUMENTS

| | | | |
|---|---|---|---|
| DE | 10 2012 112916 | A1 | 6/2014 |
| WO | 2018/183209 | A1 | 10/2018 |

OTHER PUBLICATIONS

International Search Report issued Sep. 29, 2021, in corresponding International Patent Application No. PCT/EP2021/067045, 4 pages.

*Primary Examiner* — Christine T Mui
(74) *Attorney, Agent, or Firm* — Maier & Maier, PLLC

(57) ABSTRACT

A liquid delivery device that includes a channel having an inner section lower than 9 $mm^2$ and inner volume lower than 50 mL, a gas mass flowmeter connected to the inlet of the channel, and a pressure control unit suitable to control pressure inside the channel by flowing gas through the gas flowmeter.

17 Claims, 3 Drawing Sheets

MICROFLUIDIC LIQUID DELIVERY DEVICE

FIELD

The present invention relates to a device and a method for delivering precise volume of a liquid in microfluidic conditions, in particular a particle suspension or a cell suspension.

BACKGROUND

Delivering precise volume of liquid is of primary importance in bioindustries including biopharmaceutical industries. When liquid contain highly active components, such as drugs, organelles or cells, appropriate volume shall be metered and delivered. In treatments where response of organism is not linear with dose of active administered, control of volume is critical with accuracy of 10 μL or less. Furthermore, microfluidic systems are increasingly used in bioindustries to address cost and precision issues related to the handling of such precious and active components. When microfluidic systems are used it is typically necessary to control volume accuracy below about 10 μL and sometimes much better accuracy, as well as to achieve reactive and precise flow-rate control.

Relatively accurate delivery of fluid volumes may be achievable by precision volumetric pumps. However volumetric pumps typically subject the fluid and its components to mechanical stresses which can lead to damages to the fluid or to its components. Besides precision volumetric pumps generally involve a direct contact between pump non-replaceable part surfaces and the fluid which is a source of cross-contamination. Peristaltic pumps may work as volumetric pumps and allow using a single use part of tubing in contact with the fluids, but they are not well suited for precision pumping and they may induce high mechanical stresses to handled fluid. These pumps typically do not provide an accurate and reactive flow rate control, for example syringe pumps are typically not reactive and peristaltic pumps or membrane pumps provide a pulsatile flow in the absence of dampening systems which are disadvantageous to deploy and typically reduce the reactivity.

As a result it is more common in the art that precision delivery of a fluid, in particular to a microfluidic system, be based on a gas pressure controller pressurizing the delivered fluid with a downstream fluid flow rate sensor used for fluid flow rate measurement and closed loop control of the gas pressure controller. Gas pressure controllers and fluid flow rate sensors are indeed reactive and their combined use may allow to reach accurate fluid dosing with well controlled flow rate and quick response time. However, these systems are burdened by inconvenient:

- accurate fluid flow rate sensors are expensive, in particular those sensitive in flow-rate ranges used in these applications. They require calibration and may be subject to significant drift over time,
- due mainly to their cost, fluid flow rate sensors cannot be used as single-use parts and sufficiently sensitive flow-rate sensors require a direct contact with the fluid. This results in cross-contamination to a typically inacceptable extent in the biopharmaceutical industry.

U.S. Pat. No. 6,499,515 discloses a gas cushion proportioning microsystem to proportion liquid volumes in the microliter and sub-microliter ranges, actuated by a micropump to generate a negative pressure or positive pressure.

Using a system with constant output pressure and constant hydraulic resistance is possible, using calibration procedures prior to the system use, to control flows with a pressure controller without the need for the flowrate sensor information. However, the hydraulic resistance is rarely constant during the manufacturing of a batch of biological product for example, notably due to reactions in the fluid, cell proliferation, sometimes clogging of some microchannels, among others.

Furthermore, it is usually necessary to store precious fluids containing biological products in small-cross section vessels to favor the components recovery. In such small cross-section vessels, the roughness and variability of surface chemistry due notably to the deposition of materials contain in the handled fluid leads to unregular meniscus progress with pressure and unregular Laplace pressure which make it impossible in practice to achieve high precision control without a feedback loop with a downstream flowrate sensor.

The present invention aims at overcoming some of these issues with a device intended to measure a mass of gas introduced in a millifluidic or microfluidic channel and the pressure of this gas. Then, using equation of state of the gas, it is possible to measure very precisely the volume occupied by gas introduced, which corresponds to volume of liquid displaced in the channel. With this device, a liquid can be delivered with a volume accuracy below 10 μL.

SUMMARY

The present invention relates to a liquid delivery device comprising:

i. a channel suitable to contain the liquid to be delivered, said channel having an inner section lower than 9 $mm^2$ and a inner volume $V_{channel}$ lower than $5 \cdot 10^{-5}$ $m^3$, preferably lower than $10^{-5}$ $m^3$, said channel having an inlet, an outlet and a valve;

ii. a gas mass flowmeter connected to the inlet of said channel; and iii. a pressure control unit (4) suitable to control pressure inside said channel by flowing gas through said gas mass flowmeter.

In one embodiment, the liquid delivery device comprises a filter connected between the gas mass flowmeter and the inlet of the channel.

In one embodiment, the inner volume $V_{connect}$ of connections inside gas mass flowmeter and between gas mass flowmeter and inlet of the channel is lower than $2 \cdot 10^{-5}$ $m^3$, preferably lower than $10^{-5}$ $m^3$.

In one embodiment, the gas mass flowmeter comprises a calibrated hydraulic resistance and a high-resolution differential pressure sensor that measures pressure difference between both ends of calibrated hydraulic resistance.

In one embodiment, the channel has a diameter between 0.1 mm and 3.4 mm.

In one embodiment, the channel is made of a corrosion resistant material, preferably a hydrophilic corrosion resistant material or a corrosion resistant material coated with a hydrophilic and/or antifouling film.

In one embodiment, relative variation of the sum $V_{channel}$ and $V_{connect}$ of the liquid delivery device (1) is lower than 10% under pressurization of 500 millibars, preferably lower than 3%, more preferably lower than 1%.

In one embodiment, gas leak rate of the liquid delivery device when channel and gas mass flowmeter are dry and pressurized with gas at 100 mbar above ambient pressure and when valve is closed is preferably inferior to 1 μL/s, more preferably inferior to 0.3 μL/s, and even more preferably inferior to 0.1 μL/s.

The invention also relates to a method of liquid delivery comprising the steps of:

a) providing a channel having an inlet, an outlet, a valve, a section lower than 9 $mm^2$ and an inner volume $V_{channel}$ lower than $5\cdot10^{-5}$ $m^3$, preferably lower than $10^{-5}$ $m^3$, the inlet of said channel being connected to a gas mass flowmeter and said channel containing gas on the inlet side and the liquid to be delivered on the outlet side;

b) setting a pressure in the channel with a pressure control unit so that liquid is delivered from channel through outlet;

c) measuring the mass of gas introduced in the channel through the inlet with a gas mass flowmeter; and d) determining volume of liquid delivered using equation of state of gas.

In one embodiment, steps b), c) and d) of method of liquid delivery are repeated.

In one embodiment, method of liquid delivery further comprises a measuring step of measuring the volume $V_{gas}$ which is the sum of volume $V_{connect}$ of connections inside gas mass flowmeter and between gas mass flowmeter and inlet of the channel and volume of gas contained in the channel. In some embodiments, the measuring step is repeated at least two times.

In one embodiment, the measuring step comprises the following sub-steps:

α. closing valve;

β. setting a pressure in the channel with a pressure control unit;

χ. measuring the mass of gas introduced in the channel through the inlet with a gas mass flowmeter; and δ. determining volume $V_{gas}$ using equation of state of gas.

In one embodiment, the measuring step is operated:

as a calibration between steps a) and b); or as a calibration between steps a) and b) and as a control after step d); or as a calibration between steps a) and b) and as an intermediate control after step d) when steps b), c) and d) are repeated;

The invention also relates to a method of liquid aspiration comprising the steps of:

a) providing a channel having an inlet, an outlet, a valve, a section lower than 9 $mm^2$ and an inner volume $V_{channel}$ lower than $5\cdot10^{-5}$ $m^3$, preferably lower than $10^{-5}$ $m^3$, the inlet of said channel being connected to a gas mass flowmeter and said channel containing gas on the inlet side and the liquid to be delivered on the outlet side;

b) setting a pressure in the channel with a pressure control unit so that liquid is aspired into channel through outlet;

c) measuring the mass of gas withdrawn from the channel through the inlet with a gas mass flowmeter; and d) determining volume of liquid aspired using equation of state of gas.

In the present invention, the following terms have the following meanings:

"Equation of state of gas" refers to a thermodynamic law which defines relationship between mass, pressure, volume and temperature. Ideal gas law is a particular equation of state of gas. Other equation of state of gas include virial model, Van der Waals model or Clausius model, among others.

"Longitudinal fiber" refers to the centered longitudinal axis of a considered fluidic element or, when the longitudinal axis of the fluidic element is not well defined, the direction of the flow in the fluidic element during flow operations.

"Cross-section" refers to the cross section of a considered fluidic element perpendicular to its longitudinal fiber.

"Pressure pattern" refers to a function of pressure versus time, imposed to the device for flow control.

DESCRIPTION OF THE DRAWINGS

Features and advantages of the invention will become apparent from the following description of embodiments of a device according to the invention, this description being given merely by way of example and with reference to the appended drawings in which.

DETAILED DESCRIPTION

Figure 1:
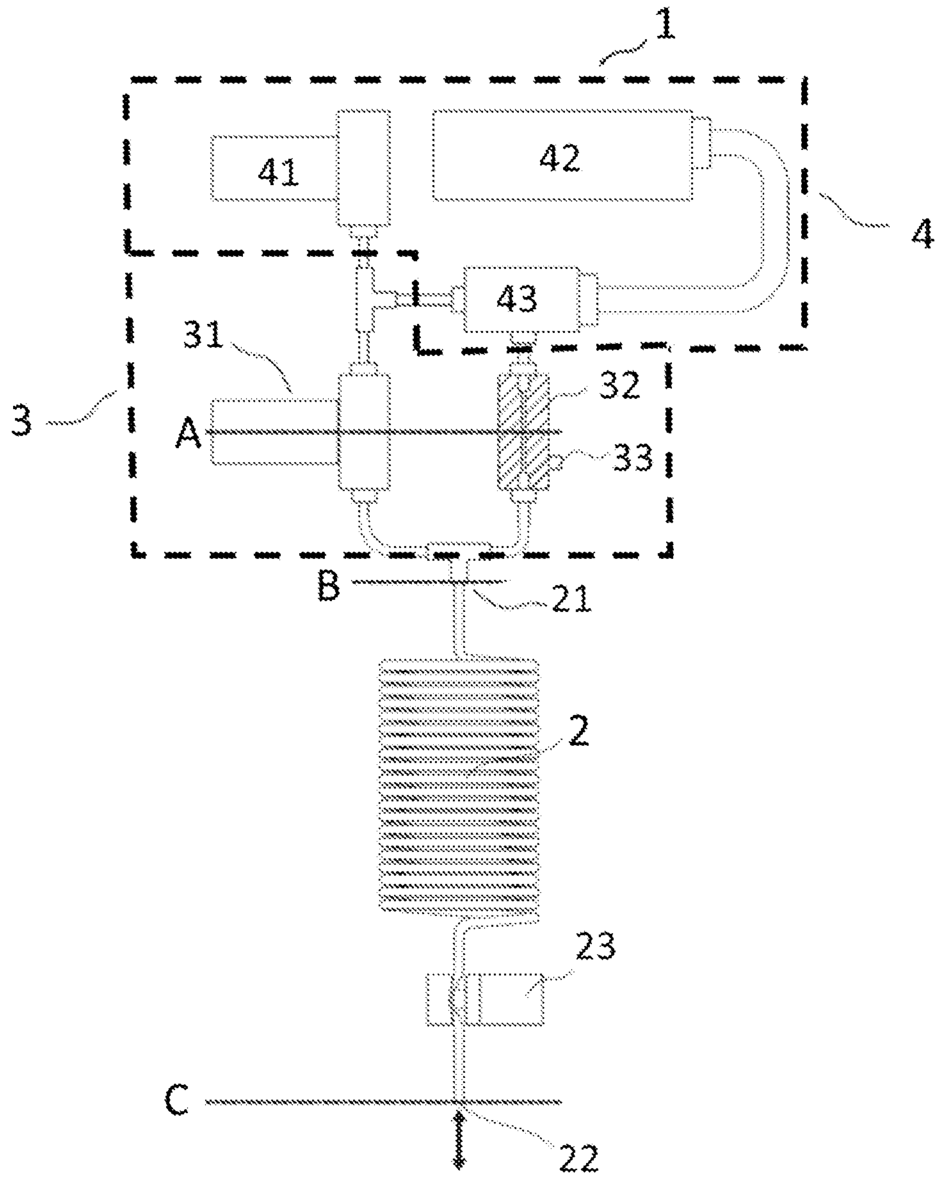
FIG. 1 is a schematic showing an embodiment of the device.

Liquid Delivery Device: Channel (FIG. 1)

The device 1 according to the disclosure comprises a channel 2 having an inner volume $V_{channel}$ and a length L of its longitudinal fiber. At one end, the channel 2 is terminated by an inlet 21, and at its other end, the channel 2 is terminated by an outlet 22. Limits of inner volume $V_{channel}$ and length L are visible on FIG. 1 with lines B (inlet 21) and C (outlet 22).

A valve 23 is placed on the channel 2, allowing closing and opening of channel 2. The valve 23 completely blocks the outflow of fluid from the outlet 22 when it is closed. Valve 23 may be situated anywhere on the channel 2, preferably at the outlet 22, for instance downstream the outlet 22 or upstream the outlet 22. In variants comprising multiple outlets an adequate valve system must similarly allow completely blocking the outflow of fluid from the outlet 22 when it is closed. The valve 23 may be of the pinch-valve type. In this case, the channel may be formed by an elastomer tubing segment. Alternatively, the valve 23 may be membrane-based valve actuated by pressure differential, eventually of the microfluidic type. The valve 23 preferably allow an easy replacement of the channel 2.

At any given point along its longitudinal fiber, the channel 2 has an inner section of surface area S lower than 9 $mm^2$, an inner diameter D corresponding to the largest distance between two points in the same cross section, and a dimension H calculated as S/D. In some embodiments, channel 2 is a cylindrical tube with an inner diameter D between 0.1 mm and 3.4 mm, preferably between 0.2 mm and 2 mm, and more preferably between 0.4 and 1 mm.

The inner volume $V_{channel}$ is lower than $5\cdot10^{-5}$ $m^3$, preferably lower than $10^{-5}$ $m^3$. The low volume of inner channel is a key parameter to achieve delivery accuracy below 10 μL.

In the embodiment shown in FIG. 1, the channel 2 of the device exhibits a compacted coiled structure, so that its length L is much greater, i.e. at least twice greater, than the largest distance between two points of the volume occupied by the channel. The compaction of the channel is necessary for the ergonomics. Indeed, the channel length L is typically large compared to, for example, the dimension of the hands of an operator. The compaction of the channel also reduces the risk of entanglement or collision. Preferably, radius of curvature of channel 2 along its longitudinal direction is larger than 3 times the inner diameter D of the channel 2. More preferably, radius of curvature of channel 2 along its longitudinal direction is larger than 5 times the inner diameter D of the channel 2.

In some embodiments, the channel 2 sustains a pressurization with water at least 500 millibar above the ambient pressure. This is functionally important because 500 millibar pressurization is obtained in ordinary operations so that such pressurization should not result in rupture or important permeation across the channel walls to avoid spillage risk and risks of alteration of the liquid to be delivered. In particular, under such pressurization conditions, the leak or permeation flow should be inferior to 60 μg/min per mL of total channel volume filled with water, when valve 23 is closed.

The channel 2 preferably shows negligible gas leaks with a gas pressurization up to 500 millibars above the ambient pressure. This is functionally important because 500 millibars pressurization is obtained in ordinary operations, and small gas leaks are difficult to identify and to correct numerically, leading to errors in volume of liquid to be delivered. The gas leak rate when channel 2 is dry and pressurized with gas at 100 mbar above ambient pressure and when valve 23 is closed (i.e. no outflow of fluid from the channel outlet 22) is preferably inferior to 1 μL/s, more preferably inferior to 0.3 μL/s, and even more preferably inferior to 0.1 μL/s.

Additionally, such pressurization, with liquid or with gas, should preferably result in a variation of the inner channel volume $V_{channel}$ lower than 10% of $V_{channel}$, preferably lower than 3%, more preferably lower than 1%, in order to avoid interpretation of a gas volume increase as a displaced liquid volume, thus losing accuracy over the liquid delivery. Various mitigation strategies are possible to achieve high accuracy of liquid delivery, about 1% or even less than 1%, despite volume changes of few percent at 500 millibar: they will be described in method sections.

So as to reduce $V_{channel}$ volume variation with working pressure, the channel 2 is preferably relatively stiff and made of rigid materials rather than soft elastomer, at least over half of its length. Minimal elastomer material section may be used for the integration of valves to reduce their impact on the system ease of use and performance.

It is advantageous that no plastic deformation or fatigue occurs during the use of the device to avoid significant loss of accuracy in the measurement of the displaced volume. As such, in preferred embodiments, the tube deformation rate during use (i.e. at a pressure of use), should be much smaller than the yield deformation rate of the material and the material should be chosen with an elastic behavior with very low, ideally no, viscous properties. However plastic deformation occurring over long periods may be compensated by regular corrective calibration.

Resistance to higher pressure, lower leaks or permeation flow rates under pressurization, and smaller variations of the channel volume during pressurization, are generally preferable.

In some embodiments, channel 2 is made of a corrosion resistant material, suitable to handle liquids. Preferably the corrosion resistant material is hydrophilic. Alternatively, the corrosion resistant material is coated with a hydrophilic and/or antifouling film. These properties are very useful to lower surface tension between liquid to be delivered and channel 2, so as to reduce Laplace pressure. In addition, a hydrophilic surface inhibits adhesion of biological particles such as cells, thus limiting issues such as build-up of cell aggregates inside channel, . . . . Antifouling films provide the same advantage.

In embodiments, it is generally preferred that a support (not shown) be used to support the compacted channel portion, for example a rigid cylinder can be used and glued to the channel, for example made of a tubing. The tubing can also, for example, be glued in its compacted shape, with glue holding its shape. The tubing can also be coiled within a container with a cylindrical or other ergonomic outer border. The tubing can also be affixed to a support by means of regularly spaced clamps. In other embodiments, the channel is formed by one or several rigid bounded parts, possibly suppressing the need for fixtures. Such means of maintaining the shape of the channel increase the ergonomics of the device, notably by avoiding risks of accidental decompaction of the channel Additionally, maintaining the arrangement of a portion of the compacted channel stabilized the geometry in which the flow occurs and, as such, geometry-dependent effects impacting liquid delivery, e.g. flow patterns, orientation of sedimentation forces (when liquid to be delivered is a suspension) with respect to the channel orientation, are also stabilized.

Liquid Delivery Device: Gas Mass Flowmeter (FIG. 1)

The device 1 according to the disclosure comprises a gas mass flowmeter 3 (delimited by dotted line on FIG. 1).

The gas mass flowmeter 3 is connected to the inlet 21 of channel 2, and measures accurately the mass of gas flowing through itself.

In terms of accuracy of volume of liquid delivered, the inner volume $V_{connect}$ of gas inside the gas mass flow meter 3 and in connection from gas mass flowmeter 3 to channel 2 is critical. Limits of inner volume $V_{connect}$ is visible on FIG. 1 with lines B (inlet 21) and A (inside the gas mass flowmeter).

Indeed, the variation of mass measured by the gas mass flowmeter 3 will be used to determine the total gas volume, noted $V_{gas}$, which is the sum of volume $V_{connect}$ of connections inside gas mass flowmeter 3 and between gas mass flowmeter 3 and inlet 21 of the channel 2 and volume of gas contained in the channel 2. In ordinary conditions (i.e. except if dedicated calibration is performed to compensate the device elasticity) the variation of the liquid volume $V_{liquid}$ in channel 2 reads: $\Delta V_{liquid}=-\Delta V_{gas}$ if $V_{channel}$ is constant. If $V_{connect}$ is small as compared to inner volume $V_{channel}$, errors in estimation of volume of liquid delivered will be minimized Preferably, inner volume $V_{connect}$ of connections inside gas mass flowmeter 3 and between gas mass flowmeter 3 and inlet 21 of the channel 2 is lower than $2\cdot10^{-5}$ m$^3$, and more preferably lower than $10^{-5}$ m$^3$.

The gas mass flowmeter 3 preferably shows negligible gas leaks with a gas pressurization up to 500 millibars above the ambient pressure. This is functionally important because 500 millibars pressurization is obtained in ordinary operations, and small gas leaks are difficult to identify and to correct numerically, leading to errors in volume of liquid to be delivered. The gas leak rate when gas mass flowmeter 3 is dry and pressurized with gas at 100 mbar above ambient pressure is preferably inferior to 1 μL/s, more preferably inferior to 0.3 μL/s, and even more preferably inferior to 0.1 μL/s.

Additionally, such pressurization, with gas, should preferably result in a variation of the inner volume $V_{connect}$ lower than 10% of $V_{connect}$, preferably lower than 3%, more preferably lower than 1%, in order to avoid interpretation of a gas volume increase as a displaced liquid volume, thus losing accuracy over the liquid delivery.

Any type of gas mass flowmeter 3 known in the industry may be used. However, those characterized by a high accuracy and a short response time are preferable.

In some embodiment, the gas mass flowmeter 3 comprises a calibrated hydraulic resistance 32 and a calibrated high-resolution differential pressure sensor 31 that measures pressure difference between both ends of calibrated hydraulic resistance 32.

Calibrated hydraulic resistance 32 comprises a resistive conduct for gas flow aimed at generating a pressure difference in response to gas flow. Resistive conduct may be a channel or tube of small cross-section and comparatively great length through which gas flowing in the calibrated hydraulic resistance is forced. It is calibrated for example by measuring the pressure difference between its extremities under a well-controlled gas flow: high gas purity, well controlled temperature, pressure and flow rate. Alternatively, the temperature, gas purity and pressure of gas at both extremities may be controlled and the gas flow rate measured. It is however more difficult and not recommended to determine the hydraulic resistance of the calibrated hydraulic resistance 32 based on the geometry of the resistive conduct. Indeed, errors in the fabrication or measurement of its inner diameter of about one percent will result in errors in the hydraulic resistance calibration greater than four percent since hydraulic resistance depends on the power minus four of a channel diameter.

Preferably, the resistive conduct is made of a corrosion resistant material. Actually, corrosion would lead to alteration of inner surface of the tube, inducing geometrical deformations and changes in the hydraulic resistance value reducing accuracy and creating the need for repeated calibration. Stainless steel and PTFE (polytetrafluoroethylene) are suitable materials for the resistive conduct of the calibrated hydraulic resistance.

Additionally, a temperature sensor 33 may be added to the calibrated hydraulic resistance. The temperature sensor allows to take into account temperature influence on gas density for mass flow rate measurements, thus increasing measurement accuracy.

The high-resolution differential pressure sensor 31 has advantageously a response time shorter than 100 ms, preferably shorter than 10 ms. With such short response time, gas mass flow may be monitored continuously with low drift and quick changes in pressure and flow rate may be handled accurately.

The high-resolution differential pressure sensor 31 has advantageously a repeatability of gas mass flow measure below 5 μg/s, preferably below 1 μg/s.

Liquid Delivery Device: Pressure Control Unit (FIG. 1)

The device 1 according to the disclosure comprises a pressure control unit 4 (delimited by dotted line on FIG. 1).

Pressure control unit 4 has two functions. First, pressure control unit 4 measures pressure applied in the channel 2 with a pressure sensor 41. During gas flow, when gas mass flowmeter 3 comprises a calibrated hydraulic resistance 32, pressure in the channel 2 is estimated with correction of pressure loss induced by calibrated hydraulic resistance 32 measured with high-resolution differential pressure sensor 31. Second, pressure control unit 4 imposes a specified pressure, according to a pressure pattern. The pressure source 42 flows gas through gas mass flowmeter 3 then into channel 2. A dispatcher 43 connects the pressure control unit to the pressure sensor 41 and the calibrated gas mass flowmeter 3.

Figure 2:
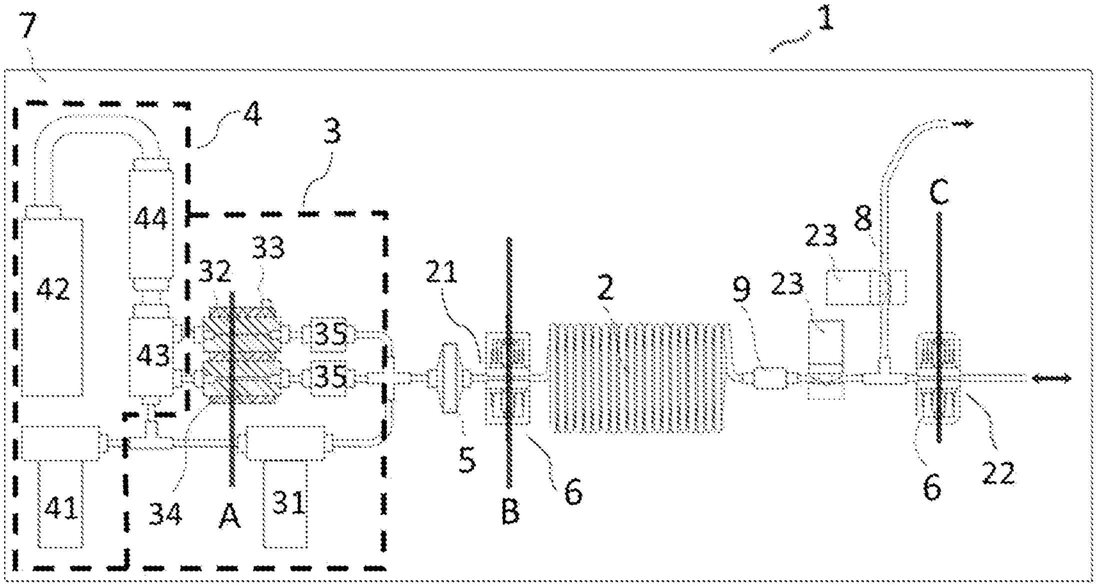
FIG. 2 is a schematic showing another embodiment of the device.

Liquid Delivery Device: Variants (FIG. 2)

Accuracy of liquid delivery is influenced by rigidity of device and fluid leaks, especially for the channel 2 and gas mass flowmeter 3.

The channel 2 and the gas mass flowmeter 3 preferably show together negligible gas leaks with a gas pressurization up to 500 millibars above the ambient pressure. The gas leak rate when channel 2 and the gas mass flowmeter 3 are dry and pressurized with gas at 100 mbar above ambient pressure and when valve 23 is closed (i.e. no outflow of fluid from the channel outlet 22) is preferably inferior to 1 μL/s, more preferably inferior to 0.3 μL/s, and even more preferably inferior to 0.1 μL/s.

Additionally, such pressurization of 500 millibars with gas should preferably result in a variation of the sum of inner channel volume $V_{channel}$ and inner volume $V_{connect}$ lower than 10% of the sum of $V_{channel}$ and $V_{connect}$, i.e. the relative variation of the sum $V_{channel}$ and $V_{connect}$ lower than 10%, preferably lower than 3%, more preferably lower than 1%, in order to avoid interpretation of a gas volume increase as a displaced liquid volume, thus losing accuracy over the liquid delivery.

The device 1 according to the disclosure may comprise additional elements, as shown on FIG. 2.

Additional elements may be added between the gas mass flowmeter 3 and inlet 21 of channel 2, such as a filter or a content sensor. Practically, the inner volume of such elements should be as low as possible, as this inner volume would be included in inner volume $V_{connect}$, the latter remaining as low as possible for the sake of liquid delivery accuracy.

A filter 5 may be added to avoid introduction of impurities (dust, oil microdroplet . . . ) contained in pressurized gas into the channel 2. Filter 5 may be a hydrophobic filter, thus avoiding condensation of vapour inside the filter. Filter 5 has typically a porosity below 0.2 μm and is made of a hydrophobic material to block accidental flow of handled liquid in the gas mass flowmeter 3.

In some variants an additional filter of small pore diameter may be added between the pressure source 42 and the dispatcher 43 to avoid contamination of the gas mass flowmeter 3 and potentially impacting its accuracy. Besides, the pressure source 42 preferably provides clean gas of well-known composition, the gas is preferably free of oil mist and airborne particles.

Sensor 6 is configured to detect the move of an interface. This sensor avoids entry of gas into outlet 22 of channel or entry of liquid into filter 5 and/or gas mass flowmeter 3: as soon as the signal difference between the two sensor subunits disposed along the channel 2 exceeds a predefined threshold, evidencing interface between gas and liquid, then flow inside channel 2 is stopped.

More precisely, in one embodiment, the sensor 6 is a light sensitive sensor and the channel 2 is made of transparent material. In this embodiment, the sensors 6 comprises, on a first side the channel 2 a set of light sources. On a second face the channel 2, the sensor 6 comprises a set of light detectors. The set of light sources faces the set of light detectors. The sensor 6 further comprise electronics controlling the light sources and measuring the light detectors signals. As the light sources emit at a constant rate, the power received by the light detectors is modulated by the presence or absence of fluid between the light sources and the light detectors. This allows the fluid detection by the sensor 6. The light sources may be electroluminescent diodes emitting in the infrared or visible range and the light detectors may be photodiodes. For better accuracy, a sensor 6 may comprise two couples of facing sources and detectors. This enables to detect when the position of the fluid extremity (i.e. meniscus or interface) is located between the two couples. This type of sensor, illustrated in FIG. 2, allows precisely knowing the position of the fluid extremity and enables flowing the fluid in a very accurate and precise fashion.

In another embodiments, the sensor 6 may comprise an acoustic source and an acoustic detector, or a high frequency electromagnetic source and an antenna.

Purge line 8 allows discarding any remaining fluid in channel 2 between two successive fluid deliveries. At the end of a first delivery, some liquid may remain between the inlet 21 and line C. The remaining liquid is easily flushed through purge line 8, so as to avoid contamination with the next fluid to be delivered by liquid delivery device 1.

A bubble trap 9 may be added along the channel 2 to eliminate bubbles which may form following the retractation of the liquid meniscus due to a residual liquid film or due to brutal liquid meniscus movements for example. Such a bubble trap needs not to create a significant gas leak to avoid system function disruption, it is therefore preferably a fixed volume trap retaining gas bubbles, inducing their coalescence, and merging them with the main gas volume after meniscus retractation through the trap.

Alternatively, another sensor 6 may be added in place of the bubble trap 9 to play the role of an active bubble trap. In this case a bubble detected by sensor 6 may trigger the activation of the purge line 8, depending on the detected bubble size, to eliminate said bubble through the purge line 8.

Thermal balancer 44 may be added to control temperature of gas to be injected in channel 2. Indeed, accuracy of volume estimation is limited by temperature variations which affect gas density. The more constant the temperature of gas inside device of invention, the better the accuracy.

For the same purpose, the whole device here disclosed may be included in a thermostatically controlled cabinet 7, so as to avoid temperature variations that could lead to errors when using equation of state of gas.

In some embodiments, several calibrated hydraulic resistances 32 may be used in the gas mass flowmeter 3. In particular, calibrated hydraulic resistances may have different values of hydraulic resistance to allow operating in different ranges while maintaining high accuracy by working in the pressure range of the differential pressure sensor. Thus, the same gas mass flowmeter 3 may be used to work in different flow ranges with high accuracy with a proper selection of calibrated hydraulic resistance 32. This selection is made by opening and closing of valves 35.

When several calibrated hydraulic resistances 32 are used, a thermal bridge 34 is advantageously added around calibrated hydraulic resistances, so as to improve their temperature homogeneity, leading to improved accuracy of temperature sensing.

Method of Liquid Delivery: Continuous or Successive Measurements

To measure accurately volume of liquid delivered, the device of invention may be operated as follow.

Pressure control unit 4 sets a pressure in the channel, according to a pressure pattern. The pressure in the channel is measured continuously with pressure sensor 41. If the gas mass flowmeter 3 is resistive, i.e. susceptible to generate a significant pressure drop, the differential pressure measure across the gas mass flowmeter 3 is used to correct the value of the pressure in the channel 2.

Gas mass flowmeter 3 measures also continuously the mass of gas introduced from dispatcher 43 inside the channel.

Figure 4:
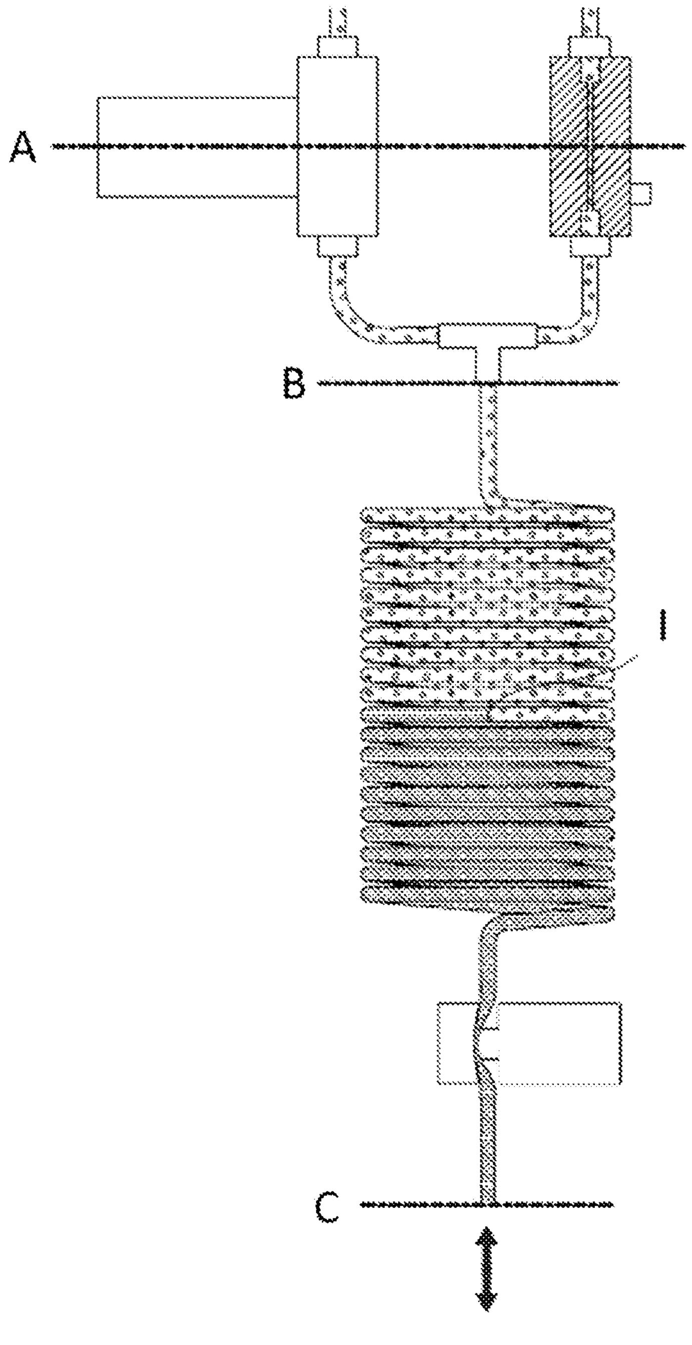
FIG. 4 is an enlargement of FIG. 1 defining $V_{gas}$. Volume filled with liquid is hatched, volume $V_{gas}$ filled with gas is shown with circles, gas and liquid being separated at interface I.

Using a differential form of equation of state of gas with time, one is then able to compute continuously the volume, referred as $V_{gas}$, which is the sum of volume $V_{connect}$ of connections inside gas mass flowmeter 3, between gas mass flowmeter 3 and inlet 21 of the channel 2 and volume of gas contained in the channel 2. FIG. 4 highlights volume $V_{gas}$ in the device as an area filled with circles. If bubbles are present in the liquid, their volumes are comprised in $V_{gas}$.

With ideal gas law, one has $$P\frac{dV}{dt} + V\frac{dP}{dt} = RT\frac{dn}{dt} + nR\frac{dT}{dt}.$$

Then, $$\frac{dV}{dt} = \frac{RT}{P}\frac{dn}{dt} + \frac{nR}{P}\frac{dT}{dt} - \frac{V}{P}\frac{dP}{dt}. \qquad \text{(I)}$$

In equation (I), mass variation is measured continuously by gas mass flowmeter 3, temperature variation is monitored by temperature sensor 33 and pressure variation is measured by pressure sensor 41. By continuous integration of equation (I) over time, it is possible to estimate $V_{gas}$ and the volume of liquid delivered.

Accuracy of the method is limited on one hand by the knowledge of initial values of pressure, volume and temperature, and on the other hand by the accuracy of sensors (pressure and gas mass) leading to drift (accumulation of measurement errors).

Usually, device is placed in a thermostatically controlled cabinet 7, so that the term associated with variations of temperature in equation (I) be cancelled.

Various pressure patterns may be imposed by pressure control unit 4.

Figure 3:
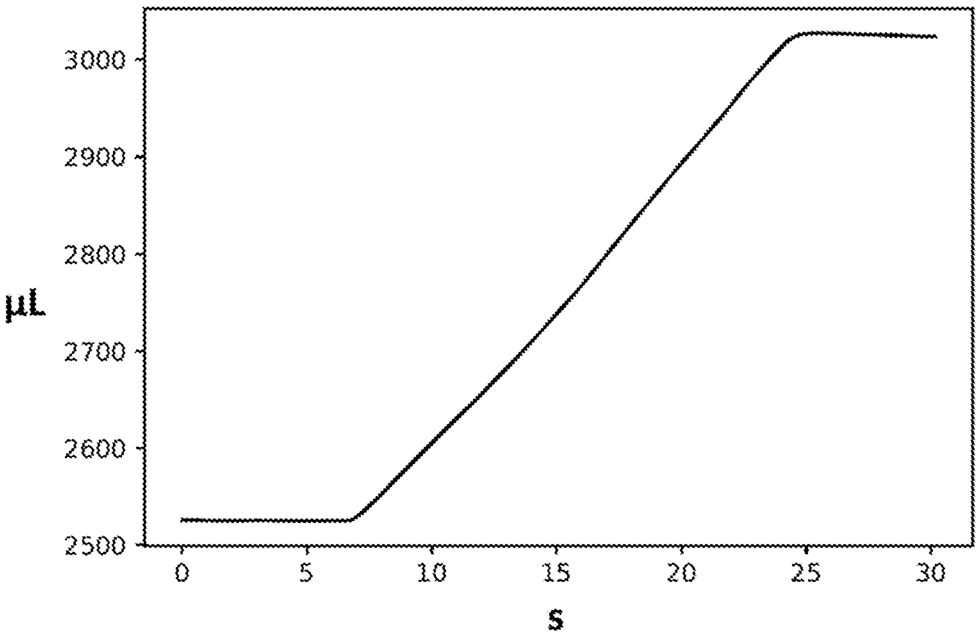
FIG. 3 is a graph showing volume of liquid delivered (μL) as a function of time (s) in an embodiment of the method.

In some embodiments, pressure is set constant until flow is stopped by lowering pressure: liquid is delivered continuously. The pressure variation speed may be purposely limited to avoid adverse effects, notably bubble formation. FIG. 3 shows the volume delivered (in µL) versus time (in seconds) for a constant pressure. For this fluid delivery, valve 23 controlling the flow in channel 2 is first closed, then pressure set at 50 millibar by pressure control unit 4. When valve 23 is opened (second 7), flow begins and is measured continuously by integration of equation (I) over time. When the target of 500 µL is reached, valve 23 is closed. In this experiment, the volume delivered has been measured separately by another method, yielding a volume of 501 µL. The error of about 1 µL for a target of 500 µL (i.e. about 0.2%) is remarkably small, demonstrating the ability of the device to deliver very precisely volume of fluids.

In other embodiments, a step pressure is applied then pressure relaxes by displacement of liquid in the channel. After relaxation, a further step pressure is applied and liquid is delivered by successive small applications of pressure.

In other embodiments, the applied pressure and flow rate are reduced toward the end of a delivery to reach a maximal accuracy of the injected volume. Indeed, suddenly stopping a fast flow at the end of delivery is subjected to greater inaccuracy due to response times of components and control modules.

Any combination of pressure patterns may be used.

Method of Liquid Delivery: Measuring Step

So as to measure variations of gas volume inside channel 2 as explained above, it is advantageous to measure accurately gas volume in the part of device conceived for controlling liquid delivery and in the channel, i.e. g $V_{gas}$, in particular initial $V_{gas}$ before liquid delivery so as to lower drift of continuous integration.

At any time during operation, valve 23 controlling the flow in channel 2 may be closed. Then a determined pressure increase ΔP is applied with the pressure control unit 4, leading to introduction of a mass of gas Δm into the channel 2, said mass of gas being measured by the gas mass flowmeter 3. As channel is closed by valve 23, and assuming that liquid and tubing are incompressible, volume $V_{gas}$ does not change. Last, by application of the equation of state of gas in isotherm conditions and assuming that liquid and tubing are incompressible, on can determine the volume $V_{gas}=f(\Delta P, \Delta m)$ For ideal gas law, $$V_{gas} = \frac{\Delta mRT}{M\Delta P},$$

where M stands for the molar mass of gas used.

Finally, pressure control unit 4 is set to relax overpressure ΔP and initial state is retrieved. If this measurement is done before liquid delivery, initial $V_{gas}$ is defined very precisely.

In preferred embodiments, this measurement is performed based on pressure pattern, such as a continuous variation of applied pressure, rather than a stepped variation. For example, a triangular or sinusoidal variation of pressure is applied. This improvement requires synchronization of sensors to determine $V_{gas}$ but allows avoiding gas flow burst which is responsible for larger errors. With a good synchronization it is further possible to make instantaneous measurements of $V_{gas}$ during pressurization in order to estimate $V_{channel}$ and $V_{connect}$ variations with pressure to correct these variations or to verify that they can be neglected.

This method may be used with multiple pressure patterns having different amplitudes, leading to a calibration of the device. Thus, a numerical correction of $V_{channel}$ volume variation with pressure may be done during delivery.

Pressure patterns may be repeated at least two times to produce multiple measurements of $V_{gas}$ which may be averaged to increase the accuracy of measurement of $V_{gas}$. When repeated, pressure patterns may be same or different.

Method of Liquid Delivery: Measuring a Delivered Volume with Successive Measures of $V_{gas}$ A precise measure of liquid delivered with device of invention can be achieved with the following steps. First, $V_{gas1}$ is measured as explained above. Then, pressure control unit 4 sets a pressure in the channel 2. Liquid contained in channel 2 is thus put in motion and is delivered through outlet. To stop liquid delivery, pressure control unit 4 lowers pressure applied to channel 2. Last, $V_{gas2}$ is measured again. The differences between $V_{gas1}$ and $V_{gas2}$ provides the volume ΔV of liquid delivered.

However, this method does not enable to measure continuously volume of liquid delivered without interrupting the flow with valve 23.

Method of Liquid Delivery: Continuous Measure and Final Control

A preferred method of measure of volume of liquid delivered is a combination of the preceding methods.

First, initial $V_{gas}$ is measured very precisely. Then, liquid is delivered and a continuous measurement is done, as explained above. When volume to be delivered is nearly delivered, flow is slowed, then stopped and final $V_{gas}$ is measured very precisely as a control. This final measurement eventually provides with a correction of continuous measurement.

Optionally, $V_{gas}$ may be measured very precisely at intermediate stages of liquid delivery, to reset parameters of continuous integration and avoid drift.

Optionally, supplementary corrective flows of smaller magnitude may be realized to correct the measured delivery errors.

Method of Liquid Delivery: Closed Loop Control

Methods disclosed above may be combined with sensors 6 and/or continuous measure of volume of liquid delivered to define a closed-loop control.

Various elements may be used and combined to achieve the closed-loop control.

Pressure pattern imposed by pressure control unit 4 imposes a specified pressure may be dynamically adjusted to achieve specific doses and flow rates.

In another embodiment, control may be done by flow rate: a specific flowrate delivery profile is determined over time and the pressure control unit 4 is used to reach a liquid delivery flow rate as close as possible to the desired profile.

In another embodiment, calibration of the device (as defined above) may be used to determine the pressure imposed at the end of a fluid delivery, so as to take into account the numerical correction of $V_{channel}$ volume variation at said pressure.

Accuracy of closed-loop control is function of the response time of the high-resolution differential pressure sensor 31 or gas mass flowmeter 3, sensor 6 and pressure control unit 4. Preferably, a global response time for closed-loop control is shorter than 100 mms, more preferably shorter than 10 ms.

Method of Liquid Aspiration

By analogy with methods of delivery, controlled volume of liquids may be sucked by the device according to the invention: if pressure control unit 4 applies a depression, liquid will flow in the channel through outlet 22.

All embodiments described above may be applied to a method of aspiration with obvious adaptation of flow directions.

While various embodiments have been described and illustrated, the detailed description is not to be construed as being limited hereto. Various modifications can be made to the embodiments by those skilled in the art without departing from the true spirit and scope of the disclosure as defined by the claims.

The invention claimed is:

1. A liquid delivery device comprising:

i. a channel suitable to contain a liquid to be delivered, said channel having an inner section lower than 9 $mm^2$ and an inner volume $V_{channel}$ lower than $5\cdot10^{-5}$ $m^3$, said channel having an inlet, an outlet and a valve;

ii. a gas mass flowmeter connected to the inlet of said channel, the gas mass flowmeter being configured to measure accurately the mass of gas flowing through itself; and iii. a pressure control unit configured to control pressure inside said channel by flowing gas through said gas mass flowmeter wherein the pressure control unit is configured:

a. to control pressure inside the channel by flowing gas through the gas mass flowmeter;

b. to determine continuously volume of liquid delivered by estimating the volume of liquid delivered to be equal to the volume of gas flowing through the gas mass flowmeter, wherein the volume of gas flowing through the gas mass flowmeter is calculated from a measured mass flow of gas flowing through the gas mass flowmeter by using an equation of state of gas; and c. to deliver liquid with a closed-loop control according to a predetermined flowrate delivery profile over time.

2. The liquid delivery device according to claim 1, further comprising a filter connected between the gas mass flowmeter and the inlet of the channel.

3. The liquid delivery device according to claim 1, wherein the inner volume $V_{connect}$ of connections inside gas mass flowmeter and between gas mass flowmeter and inlet of the channel is lower than $2 \cdot 10^{-5}$ $m^3$.

4. The liquid delivery device according to claim 1, further wherein the gas mass flowmeter comprises a calibrated hydraulic resistance and a high-resolution differential pressure sensor that measures pressure difference between both ends of calibrated hydraulic resistance.

5. The liquid delivery device according to claim 1, wherein the channel has a diameter between 0.1 mm and 3.4 mm.

6. The liquid delivery device according to claim 1, wherein the channel is made of a corrosion resistant material.

7. The liquid delivery device according to claim 1, wherein a relative variation of the sum $V_{channel}$ and $V_{connect}$ is lower than 10% under pressurization of 500 millibars.

8. The liquid delivery device according to claim 1, wherein a gas leak rate when the channel and the gas mass flowmeter are dry and pressurized with gas at 100 mbar above ambient pressure and when the valve is closed is inferior to 1 μL/s.

9. A method of liquid delivery comprising the steps of:

a) providing a channel having an inlet, an outlet, a valve, a section lower than 9 $mm^2$ and an inner volume $V_{channel}$ lower than 5.105 $m^3$, the inlet of said channel being connected to a gas mass flowmeter and said channel containing gas on an inlet side and a liquid to be delivered on an outlet side;

b) setting a pressure in the channel with a pressure control unit so that liquid is delivered from the channel through the outlet;

c) measuring the mass of gas introduced in the channel through the inlet with a gas mass flowmeter; and d) determining a volume of liquid delivered using an equation of state of gas.

10. The method of liquid delivery according to claim 9, wherein steps b), c) and d) are repeated.

11. The method of liquid delivery according to claim 9, comprising a measuring step of measuring a volume $V_{gas}$ which is the sum of volume $V_{connect}$ of connections inside the gas mass flowmeter and between the gas mass flowmeter and the inlet of the channel and volume of gas contained in the channel.

12. The method of liquid delivery according to claim 11, wherein the measuring step is repeated at least two times.

13. The method of liquid delivery according to claim 11, wherein the measuring step comprises the following substeps:

closing the valve;

setting a pressure in the channel with a pressure control unit;

measuring the mass of gas introduced in the channel through the inlet with the gas mass flowmeter; and determining a volume $V_{gas}$ using an equation of state of gas.

14. The method of liquid delivery according to claim 11, wherein the measuring step is operated:

as a calibration between steps a) and b); or as a calibration between steps a) and b) and as a control after step d); or as a calibration between steps a) and b) and as an intermediate control after step d) when steps b), c) and d) are repeated.

15. A method of liquid aspiration comprising the steps of:

a. providing a channel having an inlet, an outlet, a valve, a section lower than 9 $mm^2$ and an inner volume $V_{channel}$ lower than $5 \cdot 10^{-5}$ $m^3$, the inlet of said channel being connected to a gas mass flowmeter and said channel containing gas on an inlet side and the liquid to be delivered on the outlet side;

b. setting a pressure in the channel with a pressure control unit so that liquid is aspirated into the channel through the outlet;

c. measuring the mass of gas withdrawn from the channel through the inlet with the gas mass flowmeter; and d. determining a volume of liquid aspired using an equation of state of gas.

16. The liquid delivery device according to claim 1, wherein the gas mass flowmeter is configured to measure a variation of mass used to determine a total gas volume.

17. The liquid delivery device according to claim 16, wherein the total gas volume, noted $V_{gas}$, is a sum of an inner volume $V_{connect}$ of gas inside the gas mass flowmeter and between the gas mass flowmeter and the inlet of the channel and a volume of gas contained in the channel.

* * * * *